US010669753B2

(12) United States Patent
Liu

(10) Patent No.: US 10,669,753 B2
(45) Date of Patent: Jun. 2, 2020

(54) MOTOR VEHICLE LATCH

(71) Applicant: Kiekert AG, Heiligenhaus (DE)

(72) Inventor: Yuhui Liu, Wodehuayuan (CN)

(73) Assignee: Kiekert AG, Heiligenhaus (DE)

( * ) Notice: Subject to any disclaimer, the term of this patent is extended or adjusted under 35 U.S.C. 154(b) by 150 days.

(21) Appl. No.: 16/073,392

(22) PCT Filed: Jan. 12, 2017

(86) PCT No.: PCT/IB2017/000009
§ 371 (c)(1),
(2) Date: Jul. 27, 2018

(87) PCT Pub. No.: WO2017/130048
PCT Pub. Date: Aug. 3, 2017

(65) Prior Publication Data
US 2019/0032376 A1 Jan. 31, 2019

(30) Foreign Application Priority Data
Jan. 29, 2016 (CN) .......................... 2016 1 0065310

(51) Int. Cl.
*B62D 33/03* (2006.01)
*E05B 85/02* (2014.01)
(Continued)

(52) U.S. Cl.
CPC .......... *E05B 85/02* (2013.01); *E05B 63/0056* (2013.01); *E05B 79/04* (2013.01)

(58) Field of Classification Search
CPC ....... B63H 20/007; B67B 7/38; F02B 61/045; B30B 1/006; B30B 9/3007;
(Continued)

(56) References Cited

U.S. PATENT DOCUMENTS 5,183,300 A * 2/1993 Bonne .................. E05B 85/243 292/216
5,722,706 A * 3/1998 Bartel .................. E05B 85/045 200/61.64
(Continued)

FOREIGN PATENT DOCUMENTS

DE 19540571 5/1996
DE 19539753 4/1997
(Continued)

OTHER PUBLICATIONS

International Search Report and Written Opinion for corresponding Patent Application No. PCT/IB2017/000009 dated Aug. 9, 2017.

*Primary Examiner* — Kiran B Patel
(74) *Attorney, Agent, or Firm* — Renner, Otto, Boisselle & Sklar, LLP

(57) ABSTRACT

A motor vehicle latch with a catch and a pawl for a latching of the catch which is pivotably mounted on a latch plate or a latch case, whereby only the catch and the pawl are pivotably mounted as rigid-shaped, power-transmitted latch components of the motor vehicle latch in the same first rotational level on the latch plate or on the latch case, whereby in a system with at least two such motor vehicle latches each catch and each pawl are mounted at the same position on the latch plate or the latch case and the at least two motor vehicle latches demonstrate differently arranged screwing points in the latch plate or the latch case for screwing of one of each motor vehicle latch to a motor vehicle. This facilitates especially great flexibility with regard to the varying arrangements of the screwing points.

16 Claims, 2 Drawing Sheets

Figure 1:
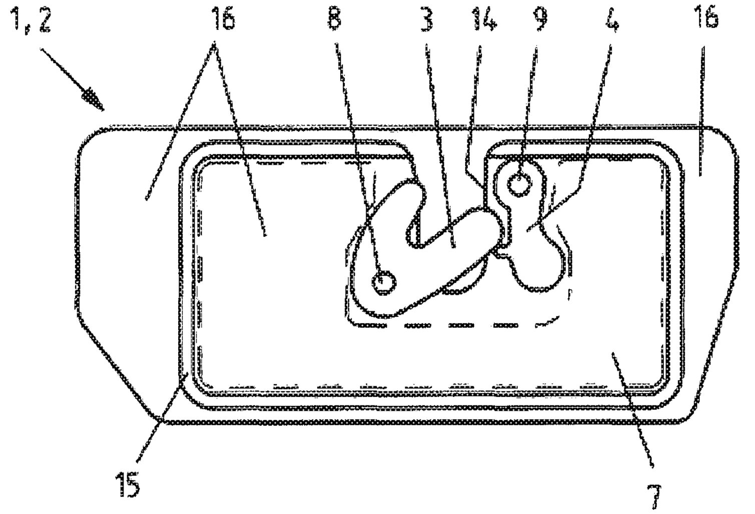

(51) Int. Cl.
*E05B 63/00* (2006.01)
*E05B 79/04* (2014.01)

(58) Field of Classification Search
CPC ......... Y10T 292/1047; Y10T 292/1082; E05B 83/36; E05B 81/06; E05B 81/20
See application file for complete search history.

(56) References Cited

U.S. PATENT DOCUMENTS

| | | | | |
|---|---|---|---|---|
| 5,992,194 | A * | 11/1999 | Baukholt | E05B 47/0009 292/201 |
| 6,422,616 | B1 * | 7/2002 | Wortmann | E05B 83/24 292/214 |
| 2001/0030426 | A1 * | 10/2001 | Kachouh | E05B 81/14 292/169 |
| 2004/0094971 | A1 * | 5/2004 | Warmke | E05B 81/06 292/201 |
| 2006/0006676 | A1 | 1/2006 | Plett et al. | |
| 2009/0134638 | A1 * | 5/2009 | Kutschat | E05B 85/247 292/216 |
| 2011/0169280 | A1 * | 7/2011 | Scholz | E05B 85/26 292/200 |
| 2012/0291358 | A1 | 11/2012 | Konchan et al. | |
| 2014/0035295 | A1 * | 2/2014 | Bendel | E05B 77/06 292/100 |
| 2014/0292002 | A1 * | 10/2014 | Graute | E05B 85/26 292/195 |
| 2015/0061301 | A1 * | 3/2015 | Torka | E05B 77/36 292/194 |
| 2015/0167363 | A1 * | 6/2015 | Scholz | E05B 85/20 292/200 |
| 2015/0308166 | A1 * | 10/2015 | Bendel | E05B 77/36 292/195 |
| 2015/0345192 | A1 * | 12/2015 | Bendel | E05B 85/26 292/195 |
| 2016/0214506 | A1 * | 7/2016 | Mueller | E05B 77/38 |
| 2016/0356065 | A1 * | 12/2016 | Schiffer | E05B 79/04 |
| 2016/0376817 | A1 * | 12/2016 | Strathmann | E05B 77/38 292/195 |
| 2017/0114576 | A1 * | 4/2017 | Fuchs | E05B 77/40 |
| 2018/0066457 | A1 * | 3/2018 | Erices | E05B 77/12 |
| 2018/0171678 | A1 * | 6/2018 | Pettengill | E05B 81/15 |
| 2018/0216374 | A1 * | 8/2018 | Hunt | E05B 85/26 |
| 2019/0003211 | A1 * | 1/2019 | Hunt | E05B 77/04 |
| 2019/0017291 | A1 * | 1/2019 | Inan | E05B 15/04 |
| 2019/0024424 | A1 * | 1/2019 | Brickner | E05B 85/243 |
| 2019/0249469 | A1 * | 8/2019 | Sturm | E05B 83/24 |
| 2019/0264477 | A1 * | 8/2019 | Manolescu | E05C 3/004 |
| 2019/0283633 | A1 * | 9/2019 | Zhuang | B60N 2/366 |

FOREIGN PATENT DOCUMENTS

| | | |
|---|---|---|
| GB | 2285481 | 7/1995 |
| GB | 2321920 | 8/1998 |
| WO | 02/079598 | 10/2002 |
| WO | 2013/110645 | 8/2013 |
| WO | 2015/062577 | 5/2015 |

* cited by examiner

MOTOR VEHICLE LATCH

The invention involves a system with at least two motor vehicle latches and a motor vehicle latch, whereby each motor vehicle latch possesses a catch and a pawl for the latching of the catch.

A motor vehicle latch generally demonstrates a latch plate or a latch case, on which for example catches, pawls, triggering levers and other rigid-shaped, force-transmitting latch components of the motor vehicle latch are pivoted in particular or basically movably arranged. Within the scope of the mounting of the motor vehicle door, the latch plate or latch case is usually mounted to the motor vehicle chassis with two or more screws to install the motor vehicle latch. A motor vehicle provides defined fixing points for such a mounting which demonstrate a motor vehicle-specific arrangement. The arrangement of the fixing points therefore varies from vehicle to vehicle.

The latch components and other functional components of the motor vehicle latch are usually arranged close together on the latch plate or within the latch case. Consequently, regularly only enough space is provided to enable screw connection, i.e. the space occupied by an extending screw as a result of screwing in from the outside into the latch plate or the latch case.

Usually a motor vehicle latch is therefore constructively adjusted to the motor vehicle-specific arrangement of the fixing points by the arrangement of the especially movable latch components which also include the locking mechanism components such as the catch and the pawl and other functional components of the motor vehicle latch being adjusted to the motor vehicle-specific arrangement of the fixing points.

Such a constructive adjustment of the entire motor vehicle latch and the especially movable latch components is very costly for every vehicle.

The aforementioned features known from the state of the art can be combined individually or in any combination with one of the objects in accordance with the invention described hereafter.

It is a task of the invention to provide a further developed motor vehicle latch.

A system with at least two motor vehicle latches in accordance with the main claim and a motor vehicle latch in accordance with the secondary claim solve the task. Advantageous execution forms result from the subclaims.

A system with at least two motor vehicle latches solves the task, whereby each motor vehicle latch demonstrates a catch and a pawl for a latching of the catch which are pivotably mounted on a latch plate or a latch case, whereby each motor vehicle latch demonstrates the same latch plate or the same latch case and each catch and each pawl—in principle always—are mounted at the same site on the latch plate or the latch case, whereby the at least two motor vehicle latches demonstrate differently arranged fixing points in the latch plate or latch case for the screwing on of one of each of the motor vehicle latches to a motor vehicle.

“Same” in “the same latch plate or the same latch case” means the latch plate or the latch case only without consideration of the fixing points or fixing openings.

The characteristic “every catch and every pawl always mounted at the same site on the latch plate or the latch case” also usually includes the case of back-to-front executions for example for left and right motor vehicle lateral doors. Despite the back-to-front arrangement such two motor vehicle latches would therefore be included by this feature.

A fixing point means a site at which for example a fixing opening is provided in order to screw the motor vehicle latch onto a motor vehicle.

System with at least two motor vehicle door latches relates to at least two separate motor vehicle latches which can be respectively installed in different motor vehicles. The at least two motor vehicle latches of the system can be manufactured jointly and can therefore originate from the same production line.

As the catch and the pawl are always arranged at the same site on the latch plate or latch case regardless of the arrangement of the fixing points of the motor vehicle and only the arrangement of the fixing points in the latch plate or the latch case are adjusted to the provided arrangement of the fixing points, the otherwise necessary expenditure from the constructional adjustment of the especially movable latch components can be saved on every vehicle.

In an execution form there is an empty internal cavity in order to provide space for screw connections to the fixing points of the at least two motor vehicle latches in particular extending directly from one interior of the latch plate or the latch case from the latch plate or the latch case adjacent to the catch and the pawl. In particular, the empty cavity covers the fixing points of the at least two motor vehicle latches completely.

Empty cavity means a coherent volume which includes no mass bodies, i.e. components.

Extending inside means in a direction from the outside to the inside, in particular orthogonally to the latch plate or the latch case.

Empty cavity to provide space for screw connections to the fixing points of the at least two motor vehicle latches means that the same empty cavity on the first motor vehicle latch and the second motor vehicle latch is provided which is provided in such a way that the same empty cavity both in the first motor vehicle latch and also in the second motor vehicle latch is capable of providing enough space to attach the latch plate or the latch case using the insertion of screws into the respective fixing points.

Fixing points covered by the empty cavity means that the fixing points are covered by the empty cavity flatly parallel to the latch plate or the latch case. The fixing points are therefore located within the flat expansion of the empty cavity parallel to the latch plate or the latch case.

By providing an empty cavity alongside the catch and the pawl a type of buffer zone is facilitated which provides space for a flexible arrangement of the fixing points without necessitating adjustment of the arrangement of the catch and pawl.

In particular, the extension of the empty cavity within the motor vehicle latches can be defined by a closed cover, i.e. a purely geometrical cover and not a representational cover, whereby the narrowest point of the cover is larger than 0.3× or 0.5×, preferably 1×, and/or smaller therefore twice, preferably smaller therefore 1.5×, of a thickness of the catch in the direction of the catch in the direction of the catch axis and/or—in particular at a level parallel to the latch plate or latch case—larger than 10× the diameter of a screw opening in the latch plate or the latch case for a screw connection with the motor vehicle.

The narrowest point means a narrowest passageway of the cover or the narrowest distance between two points on the cover.

In particular, the empty cavity has a widest point, i.e. two points on the cover with the greatest distance from one another, with an extension—i.e. distance of the two points with the greatest distance on the cover—of at least 20%, preferably 50%, most preferably 90%, of the length of the latch plate, which is greater than the breadth of the latch plate, whereby the length and the breadth of the latch plate span the surface of the latch plate, in particular orthogonally to the catch axis.

Due to an empty cavity with a narrowest point of the cover in the areas described above and/or a widest point with the extensions described above an especially large buffer zone can be created for different arrangements of fixing points of different vehicles which makes the otherwise necessary expense of the constructive adaptation of the especially movable latch components on every vehicle obsolete.

A further aspect affects a motor vehicle latch, in particular in the system described above encompassing a catch and a pawl for a latching of the catch, whereby only the catch and the pawl are pivotably arranged as the only rigid-shaped, power-transmitted—especially movable—latch components of the motor vehicle latch in the same rotational level, in particular directly on a latch plate or a latch case. Preferably, no other rigid-shaped power-transmitted—especially movable—latch component of the motor vehicle latch or at most a further rigid-shaped, power-transmitted—especially movable—latch component of the motor vehicle latch is pivotably arranged in the same first rotational level, in particular directly on a latch plate or on a latch case. Preferably the latch components stated above are locking mechanism components.

Motor vehicle latch especially in the system described above means that the motor vehicle latch conforms to one of at least two motor vehicle latches of the system described above. The execution forms of one of the at least two motor vehicle latches of the system and the execution forms of the motor vehicle latch described hereinafter can therefore be mutually related to one another and combined with one another.

The motor vehicle latch, as for the system described above, is primarily a motor vehicle door latch, preferably a motor vehicle lateral door latch.

Rigid-shaped, power-transmitted—especially movable—latch components of the motor vehicle latch generally comprise, in addition to the catch and pawl for example, further especially movable and/or rotatable levers which can interact by a translational movement or a pivoting movement with other latch components and/or the locking mechanism with retention of their external shape, for example triggering or activation levers. Elastically deforming springs and other functional components which are not intended for a rigid-shaped, power-transmitting and movement-transmitting interaction are not included in the rigid-shaped, power-transmitting latch components in the sense of the present registration. Rigid-shaped means that a component is designed in such a way that its shape should be maintained in operation. Minimal, practically imperceptible deformations which basically occur on every component are not to be viewed in the process.

A rotational level is orientated orthogonally to a pivoting axis of a pivotably arranged latch component and, in a similar way to a story of a building, encompasses all latch components interacting with one another at this common rotational level. Motor vehicle latches can demonstrate several rotational levels for the latch components, for example to adjust the external dimensions of the motor vehicle latch to the installation space.

Some of the latch components then change to a first rotational level with one another and other latch components to a second rotational level.

The second rotational level is generally arranged in the direction of a pivoting axis of a latch component of the first rotational level and in particular parallel to the first rotational level.

A moment or a movement is frequently transmitted from a latch component of the first rotational level to a latch component of the second rotational level by means of a towing arm then a force.

A rotational level thus generally relates to several latch components within a limited height section along a pivoting axis of one of the latch components.

By only the catch and pawl and preferably no other latch component or a maximum of one further latch component being pivotably mounted as a single rigid-shaped, force-transmitted latch component of the motor vehicle latch in a same first rotational level, especially directly on a latch plate or a latch case the pre-requisites are created for providing for an empty cavity as a buffer zone for different arrangements of fixing points for different vehicles.

The otherwise necessary expenditure on the constructional adaptation of the especially movable latch components on each vehicle can thus be saved.

A compact design is always striven towards for a motor vehicle latch. The professional is therefore reluctant to provide for an empty cavity as a buffer zone. However, the inventors have realized that the expense from the otherwise customary constructional adaptation of the especially movable latch components on each vehicle is considerably higher compared with the especially one-off constructional cost of redesigning a motor vehicle latch in such a way that despite the provision of an empty cavity as a buffer zone for varying fixing points it nevertheless fits in the constructional space provided for in the motor vehicle.

In particular, the extension of the empty cavity within the motor vehicle latch can be defined by a closed cover.

Here cover means a purely geometrical cover and not a representational cover.

An empty cavity defined by a closed cover creates a coherent, connected volume without divisions within the cover or the cavity. This facilitates especially great flexibility with regard to the selection of the fixing point.

In principle, the empty cavity relates to the condition before mounting of the motor vehicle latch. Because after the attachment of the motor vehicle latch to the vehicle by screwing together the screws penetrate precisely this empty cavity and thus constitute a limitation which shifts, reduces and/or constricts the cover. If, for example, other components are provided for a screw connection or if it is envisaged to deform the latch plate or the latch case on a screw point, e.g. to bend it internally, these components and deformations which are first realized in reaction to a specified arrangement of screwing points are also not attributable to the condition before mounting.

In an execution form a narrowest point of the cover is larger than 0.3× or 0.5×, preferably 1×, and/or smaller therefore twice, preferably smaller therefore 1.5×, of a thickness of the catch in the direction of the catch axis and/or—in particular at a level parallel to the latch plate or latch case—larger than 10× the diameter of a screw opening in the latch plate or the latch case for a screw connection with the motor vehicle.

The narrowest point means the narrowest passageway of the cover or the narrowest distance between two points on the cover which can be connected by a route which is completely within the cover and this does not intersect except at the two points.

In an execution form, the empty cavity has a widest point with an expansion which corresponds to at least 20%, preferably 50%, most preferably 90%, of the length of the latch plate or the latch case.

The widest point means two points on the cover with the greatest distance from one another which can be connected by a route which is completely within the cover and this does not intersect except at the two points. The length of this route is described as an expansion of the widest point.

The length of the latch plate or the latch case spans, together with the breadth, the surface of the latch plate or the latch case. The length is preferably orientated transversely to an intake slot of the latch plate or the latch case. In principle the breadth is the expansion orthogonally to the length, whereby the length and the breadth are generally orthogonal to the catch axis. Preferably the length demonstrates a greater expansion than the breadth.

Due to an empty cavity with a narrowest and/or widest point of the cover in the areas described above an especially large buffer zone can be created for different arrangements of fixing points of different vehicles which makes the otherwise necessary expense from the constructive adaptation of the especially movable latch components on every vehicle obsolete.

In a design form directly from the latch plate or the latch case an empty cavity stretches inwards to provide space for a screw connection to connect the latch plate or the latch case with the vehicle, preferably on a surface parallel to the latch plate or the latch case of at least 30%, preferably 50%, most preferably 100%, and/or a maximum 250%, preferably 200%, most preferably 150% of the surface of the catch and the pawl and optionally of a maximum of one further especially movable latch component.

Space for a screw connection to connect the latch plate or the latch case to the vehicle means at least the three-dimensional space occupied by an extending screw as a result of screwing in externally into the latch plate or the latch case and/or a mounting fixture for a screw, especially a nut with a thread or similar. Preferably the space in the revolving level at least corresponds to the diameter of the screw. The space orthogonally to the latch plate or the latch case preferably corresponds to the length around which a screw is turned into the latch plate or the latch case and extends there.

An internal extension of an empty cavity on a surface parallel to the latch plate or the latch case means that an empty three-dimensional cavity is spanned by an axis directed from outwards to inwards, for example orthogonally to the latch plate or parallel to the catch axis, and a surface parallel to the latch plate or the latch case. Parallel to the latch case means parallel to the external wall of the latch case with screw openings for screwing together with the vehicle chassis.

Surface of the catch and the pawl and optionally the maximum of one further latch component means all respective surfaces of the stated latch components which is limited by the external contours radially to the respective pivoting axis, i.e. viewed from the external contours in the rotational level.

The expression “viewed in rotational level” means the direction orthogonally to a pivoting axis of a stated latch component, preferably the catch axis. Dependent on the context, a flat level orthogonally to the pivoting axis can also be meant which then in particular intersects the pivoting axis in such a way that preferably all or at least most especially movable latch components of the stated revolving level runs preferably centrally through the especially movable latch components of the stated revolving level.

Due to the provision of an empty cavity, a buffer zone can be facilitated for flexible placement of the fixing points and thus the expense for adapting a large predominant section of the especially movable latch components to a changed arrangement of the fixing points reduced or even completely prevented.

Because the empty cavity covers an area of at least 30%, preferably 50%, most preferably 100%, and/or maximum 250%, preferably 200%, most preferably 150% of the surface of the catch and the pawl and optionally the maximum of one further latch component an especially large buffer zone can be created and thus the expenditure for adapting the arrangement of the catch, pawl and other latch components and other functional parts to an especially large number of different arrangements of fixing points of different vehicles be saved. In principle, instead only an adjustment of the arrangement of the screw openings is necessary. Because the empty cavity can ensure that enough space is always available for the screw connections of varying arrangements of the fixing points.

In one execution form a second rotational level is envisaged which, viewed from the latch plate or the latch case, is arranged above the first rotational level.

Space can thus be created for the empty cavity in the first rotational level.

In one execution form the flat extension of the motor vehicle latch on the second rotational level is larger than the flat extension of the motor vehicle latch on the first rotational level and/or the flat extension of the motor vehicle latch on the second rotational level covers the flat extension of the motor vehicle latch on the first rotational level completely.

A compact motor vehicle latch can thus be maintained in the first rotational level despite the provision of a cavity.

In particular, the empty cavity is arranged on a side of the catch turned away from the pawl and/or a side of the pawl turned away from the catch. This facilitates especially great flexibility with regard to the arrangement of the fixing points.

A further aspect of the invention affects the motor vehicle latch, in particular in the system described above, comprising a catch and a pawl for latching of the catch, whereby an empty cavity or the aforementioned empty cavity stretches directly from the latch plate or the latch case inwards to provide space for a screw connection to connect a latch plate or the latch case of the motor vehicle latch with the motor vehicle.

In particular, the extension of the empty cavity within the motor vehicle latch can be defined by a closed cover.

Preferably a narrowest point of the cover is larger than 0.5× the thickness of the catch in the direction of the catch axis and/or larger than 10× a diameter of a screw opening in the latch plate for a screw connection with the motor vehicle.

Execution examples of the invention are explained in further detail on the basis of figures hereinafter. Features of the execution example can be individually or severally combined with the stressed object.

The following are shown:

FIG. 1: A top view of the motor vehicle door latch without the latch plate.

Figure 2A:
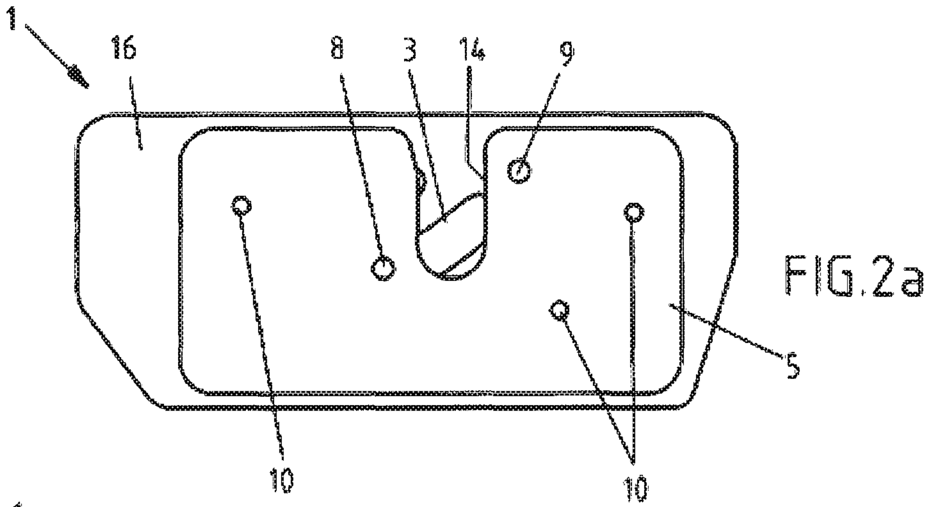
Figure 3A:
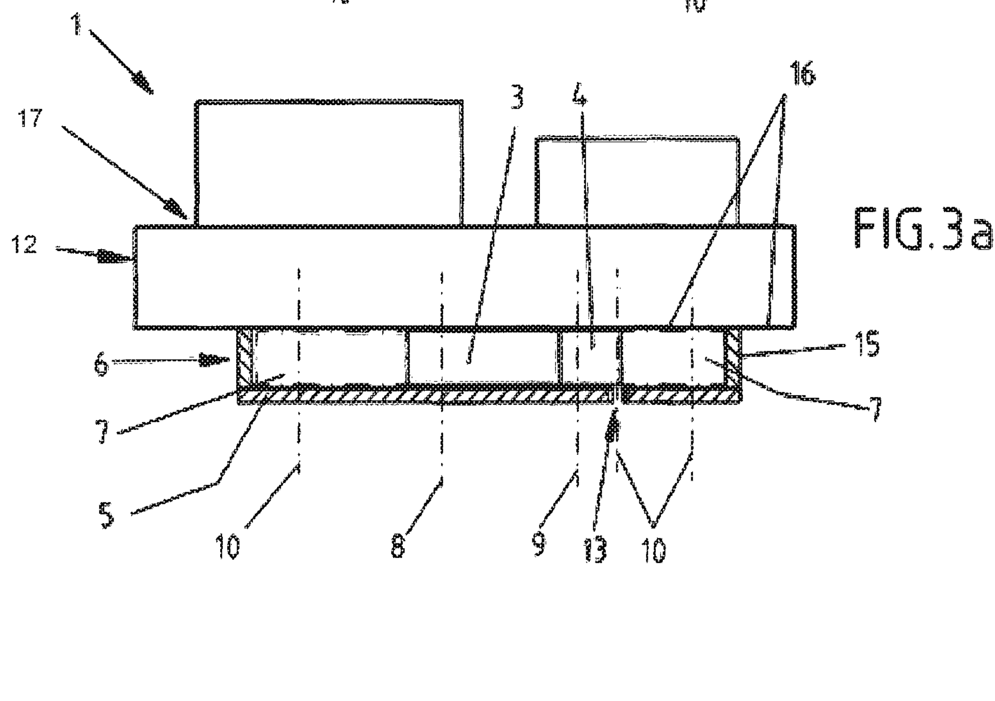
Figure 2B:
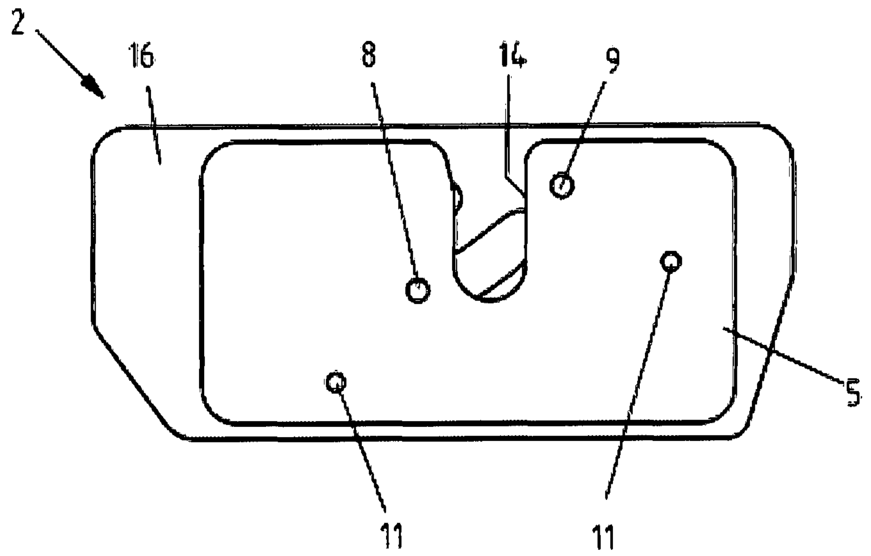
Figure 3B:
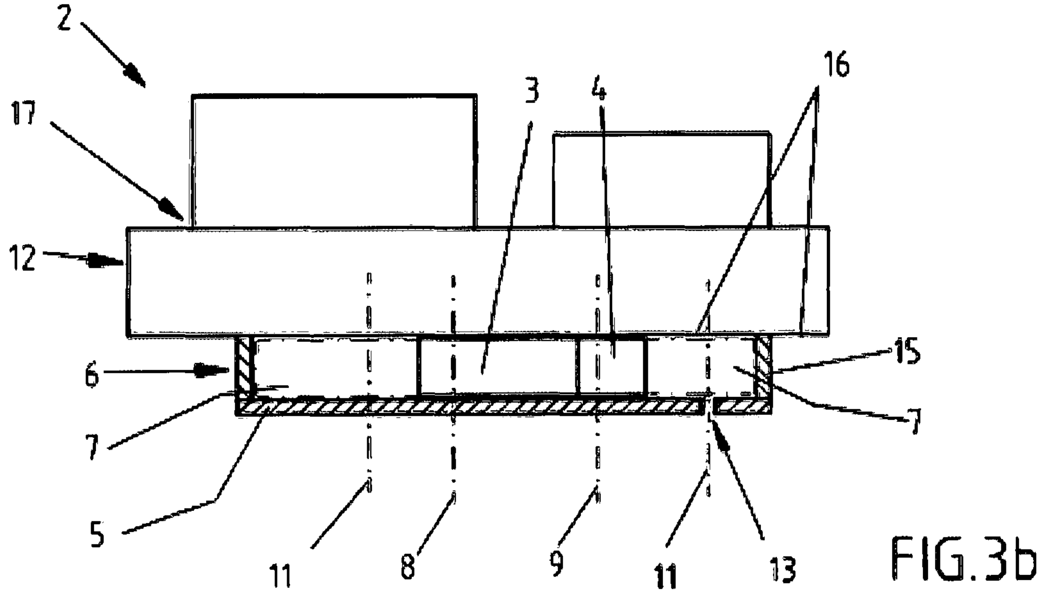

FIG. 2*a*: Top view of the first motor vehicle door latch with a latch plate;

FIG. 2*b*: Top view of the second motor vehicle door latch with a latch plate;

FIG. 3*a*: Side view of a first motor vehicle door latch with latch plate with a cross-section through the first rotational level;

FIG. 3*b*: Side view of a second motor vehicle door latch with latch plate with a cross-section through the first rotational level.

A motor vehicle latch 1, 2 in particular in accordance with the present registration includes at least a latch plate 5 or a latch case generally made of metal with especially rotating latch components located thereon or therein or as in the present case locking mechanism components, as outlined in FIGS. 1 to 3, in these execution examples the catch 3 and the pawl 4.

The descriptions set out below in conjunction with the latch plate can be transferred analogously onto a latch case.

The latch plate 5 is generally equipped with an inlet slot 14 for the mounting of a locking bolt which is not shown. A locking mechanism includes the rotatable catch 3 for the mounting of the locking bolt. As a further locking mechanism component the locking mechanism demonstrates the pawl 4 with which the catch 3 can be latched. The catch 3 and the pawl 4 are especially rotatable latch components so to speak.

The catch 3 of a motor vehicle latch 1, 2 normally has a fork-shaped inlet slot formed by a load arm and a catching arm in which the locking bolt of a motor vehicle door, in particular a motor vehicle side door, or a flap, for example a bonnet or a boot lid goes when the door or flap is closed.

With the aid of the catching arm, the locking bolt then rotates the catch 3 from an open position to a closed position. If the catch 3 has reached the closed position, it is latched via the pawl 4 in this position. The locking bolt can no longer leave the inlet slot 14 of the catch 3 as it is prevented by the load arm. This latching position is known as the main latching position.

There are motor vehicle latches with a second latching position, i.e. the so-called pre-latching position. The aim of the pre-latching position is to catch the relevant door or flap if it does not reach the main latching position during closure.

In the pre-latching position the catch 3 is consequently not completely closed.

However, an opening movement of the catch 3 is already prevented by a pawl 4. The area of the catch 3 which accommodates the pawl 4 in this position is described as a pre-latch. Finally, in the main latching position the catch 3 is completely closed. The pre-latch is therefore a transitional state between the open state and the main latch and is envisaged for safety reasons.

The optionally maximum one—especially rotatable—latch component can be a pre-latch pawl in one execution form or a blockade lever to hold the pawl in the main latch position or another lever, for example an ejector lever. A blockade lever is a locking mechanism component so to speak.

FIG. 1 shows a top view of a motor vehicle latch 1, 2 without a latch plate, therefore viewed in the direction of the catch axis 8, whereby the depiction of FIG. 1 is the same for a first and second motor vehicle door latch.

Only the catch 3 and the pawl 4 are envisaged as individual, rigid-shaped, power-transmitted latch components of the motor vehicle latch 1, 2 in the first rotational level 6 in addition to the springs which are not illustrated. The extension of the motor vehicle latch 1, 2 on the first rotational level 6 is surrounded by a housing wall 15 of a housing 17 which in the case of a latch case is partly, predominantly or completely provided by the latch case.

The housing wall 15 surrounds a fundamentally rectangular empty cavity 7. As the catch 3 and the pawl 4 are also surrounded by the housing wall 15, the empty cavity 7 is furthermore limited by the catch 3 and the pawl 4. A housing plate 16 of the housing 17 separates an area of the first rotational level 6 from an area of the second rotational level 12 arranged above. The housing plate 16 thus also constitutes a limit for the cavity 7.

The predominantly rectangular housing wall 15 has a breadth—in particular parallel to the inlet slot 14—of at least 60%, preferably 80%, of the breadth of the housing 17 or the housing plate 16 and/or a length of at least 50%, preferably 70%, of the length of the housing 17 or the housing plate 16. The housing wall 15 has a height in the direction of the catch axis 8 of 50% to 150% of the thickness of the catch 3, i.e. the extension of the catch 3 in the direction of the catch axis 8.

The housing wall 15 can demonstrate an opening at a point, thus for example in the present case in the area of the inlet slot 14. However, in particular a second site on the opposite side of the inlet slot 14 can also demonstrate an opening, in order for example to provide for a preferably flat activation element which is conducted in particular close to the housing plate 16 and not to be assigned to the first rotational level in order not to represent a disadvantageous limitation for the empty cavity 7.

In particular, a pin which is not illustrated is mounted as a pivot bearing of other latch components of the second rotational level 12 which are not illustrated to the housing plate 16, especially in such a way that the pin penetrates through the housing plate 16, can be seen from the first rotational level 6, but preferably does not extend there. Furthermore, the housing plate 16 demonstrates limited, flat depressions and bulges in places which can be predominantly rectangular. A particularly compact design can thus be attained.

The empty cavity 7 extends in an especially large volume in particular on a side of the catch 3 which is turned away from the pawl 4 and/or on a side of the pawl 4 which is turned away from the catch 3, whereby both areas are advantageously connected on the opposite side of the inlet slot 14 and form a closed volume without components or parts of the motor vehicle latch 1, 2, which can be geometrically defined by a cover—in FIGS. 1, 3*a* and 3*b* the cover is diagrammatically indicated by a dotted line.

The housing plate 16 is in particular connected or executed firmly bonded to or in the same component as the housing wall 15 and/or the housing 17.

An especially large empty cavity 7 can be provided in such a way in order to be able to offer space for the relevant screw connections for varying arrangements of fixing points 10, 11 to the vehicle in which only the screw openings of the latch plate 5 are displaced (see FIG. 2*a*, 2*b*).

FIGS. 2*a* and 2*b* show the first and second motor vehicle door latch 1, 2 with a latch plate 5, whereby the first motor vehicle door latch 1 is only distinguished from the second motor vehicle door latch 2 in that the screw openings on the fixing points 10 or 11 are arranged from one another in a different fashion.

The empty cavity 7 provides sufficient space for both arrangements of the screw points 10, 11 equally in order to attach the first and second motor vehicle door latch 1, 2 to the respective latch plate 5 on a motor vehicle.

The first motor vehicle door latch 1 furthermore demonstrates three screwing points 10 and the second motor vehicle door latch 2 only two screwing points 11.

FIGS. 2*a*, 2*b* also show the axes connected with the latch plate 5 for the pivotable siting of the catch 3 around the catch axis 8 and the pawl 4 around the pawl axis 9.

The latch plate is screwed into the housing wall 15 (not illustrated).

The screw openings provided for on the screwing points 10, 11 can demonstrate a thread 13 in a preferred execution form in order to be able to produce a screw connection with the vehicle without further parts in a special way.

FIGS. 3*a* and 3*b* show a lateral view of the first and second motor vehicle door latch 1, 2, whereby the area of the first rotational level is shown in the cross-sectional illustration. Also viewed from above, therefore in particular in the direction of the catch axis 8 or orthogonally to the latch plate 5, the empty cavity is free from any components or other mass bodies above a height which roughly corresponds to the thickness of the catch 3 in the direction of the catch axis 8. Air and other gases in addition to perhaps strewn mass particles are not mass bodies for the purpose of the present registration.

The catch 3 and the pawl 4 are preferably arranged in such a way that the rotational area catch 3 and pawl 4 take place on an area where no screwing points 10, 11 occur, in particular in consideration of the distribution on different motor vehicles. Thus, the screwing points shown in FIGS. 3*a* and 3*b* (indicated as dot dashed lines) also habitually fall into the empty cavity 7 in the state before installation and do not intersect the catch 3 or pawl 4 and their trajectories (not illustrated)

The invention claimed is:

1. A motor vehicle latch system comprising:

at least two motor vehicle latches being configured for arrangement in different motor vehicles, each motor vehicle latch including a latch plate, a catch, and a pawl for latching of the catch which is pivotably mounted on the latch plate, wherein the latch plate of each motor vehicle latch has a same structure, wherein the catch and the pawl of each motor vehicle latch are mounted at a same location on the respective latch plate in the motor vehicle latches, and wherein each of the at least two motor vehicle latches has a pattern of screwing points formed in the latch plate for screwing the respective motor vehicle latch to one of the different motor vehicles, and wherein the at least two motor vehicle latches have different patterns of screwing points that correspond to the different motor vehicles.

2. The motor vehicle latch system in accordance with claim 1, wherein each motor vehicle latch includes a housing wall that surrounds the catch and the pawl, wherein the housing defines an empty cavity that extends alongside the catch and the pawl, and wherein the empty cavity is configured to accommodate screw connections arranged in the screwing points of the respective motor vehicle latch.

3. The motor vehicle latch system according to claim 1, wherein only the catch and the pawl are pivotably mounted in a same first rotational plane on the latch plate.

4. The motor vehicle latch system according to claim 3, wherein each motor vehicle latch includes a housing wall that surrounds an empty cavity configured to accommodate a screw connection to connect the latch plate with the respective one of the different motor vehicles, wherein the empty cavity extends directly inwards to connect the latch plate of with the respective one of the different motor vehicles.

5. The motor vehicle latch system according to claim 4 wherein each motor vehicle latch includes a cover that closes the empty cavity, wherein an extension of the empty cavity is defined by the closed cover.

6. The motor vehicle latch system according to claim 5, wherein the cover has a narrowest point that is larger than half of a thickness of the catch in a direction of a rotational axis of the catch.

7. The motor vehicle latch system according to claim 6, wherein a widest width of the empty cavity is at least 20% of a length of the latch plate.

8. The motor vehicle latch system according to claim 4, wherein the empty cavity extends over a surface parallel to the latch plate having a length that is between 30% and 250% of a length of the catch and the pawl.

9. The motor vehicle latch system according to claim 3, wherein each motor vehicle latch has a second rotational plane arranged above the first rotational plane.

10. The motor vehicle latch system according to claim 9, wherein each motor vehicle latch has a housing wall that extends in the first rotational plane and a housing plate that extends in the second rotational plane, wherein a length of the housing plate larger than a length of the housing wall.

11. The motor vehicle latch system according to claim 6, wherein each of the screw points in the respective motor vehicle latch has a diameter and the narrowest point of the cover is larger than ten times the diameter of the screw points.

12. The motor vehicle latch system according to claim 7, wherein the widest width of the empty cavity is at least 50% of the length of the latch plate.

13. The motor vehicle latch system according to claim 12, wherein the widest width of the empty cavity is at least 90% of the length of the latch plate.

14. The motor vehicle latch system according to claim 8, wherein the surface parallel to the latch plate has a length that is between 100% and 150% of the length of the catch and the pawl.

15. The motor vehicle latch system according to claim 10, wherein the housing plate separates the first rotational plane from the second rotational plane.

16. The motor vehicle latch system according to claim 10, wherein the housing plate extending in the second rotational plane covers the housing wall extending in the first rotational plane completely.

* * * * *